United States Patent
Raghavan et al.

(10) Patent No.: US 10,579,952 B2
(45) Date of Patent: Mar. 3, 2020

(54) TRACKING SHIPMENT CONTAINER

(71) Applicant: INTERNATIONAL BUSINESS MACHINES CORPORATION, Armonk, NY (US)

(72) Inventors: Venkat Raghavan, New Castle, NY (US); Dinesh C. Verma, New Castle, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 631 days.

(21) Appl. No.: 15/151,700

(22) Filed: May 11, 2016

(65) Prior Publication Data

US 2017/0330143 A1 Nov. 16, 2017

(51) Int. Cl.
*G06F 17/21* (2006.01)
*H04L 29/08* (2006.01)
*G06Q 10/08* (2012.01)

(52) U.S. Cl.
CPC ....... *G06Q 10/0833* (2013.01); *G06F 17/212* (2013.01); *H04L 67/32* (2013.01)

(58) Field of Classification Search
USPC ........................................................ 707/736
See application file for complete search history.

(56) References Cited

U.S. PATENT DOCUMENTS

| 6,233,601 | B1 * | 5/2001 | Walsh | G06F 9/465 |
| | | | | 709/202 |
| 7,035,872 | B2 * | 4/2006 | Phillips | G06Q 20/102 |
| 7,385,500 | B2 * | 6/2008 | Irwin | G06Q 10/08 |
| | | | | 340/431 |
| 7,406,440 | B2 * | 7/2008 | Napier | G06Q 10/0831 |
| | | | | 705/24 |

(Continued)

FOREIGN PATENT DOCUMENTS

| WO | 0159602 A9 | 10/2002 |
| WO | 2015134479 A2 | 9/2015 |

OTHER PUBLICATIONS

Adamiak, Mark, and William Premerlani. "Data communications in a deregulated environment." IEEE Computer Applications in Power 12.3 (1999): 36-39. (Year: 1999).*

(Continued)

*Primary Examiner* — Mohsen Almani
(74) *Attorney, Agent, or Firm* — Cantor Colburn LLP; Anthony Curro

(57) ABSTRACT

Technical solutions are described for transportation of a shipment container. An example method includes receiving, by a first client device, a document schema from a document schema server, the document schema corresponding to a second client device. The method further includes creating, by the first client device, an electronic document according to the document schema, the electronic document created for transmission to the second client device. The creating includes generating, by the first client device, the electronic (Continued)

document including data-fields as specified by the document schema, and filling the data-fields of the electronic document as specified by the document schema. The computer-implemented method also includes transmitting, by the first client device, the electronic document for receipt by the second client device.

16 Claims, 9 Drawing Sheets

(56) References Cited

U.S. PATENT DOCUMENTS

| | | | | |
|---|---|---|---|---|
| 8,655,756 | B2* | 2/2014 | Seubert | G06Q 20/102 |
| | | | | 705/35 |
| 2002/0042762 | A1* | 4/2002 | McQuade | G06Q 10/08 |
| | | | | 705/29 |
| 2003/0058277 | A1* | 3/2003 | Bowman-Amuah | |
| | | | | G06F 16/289 |
| | | | | 715/765 |
| 2003/0086536 | A1* | 5/2003 | Salzberg | H04M 3/22 |
| | | | | 379/15.02 |
| 2007/0288254 | A1* | 12/2007 | Eisner | G06Q 10/0637 |
| | | | | 358/1.11 |
| 2008/0168109 | A1* | 7/2008 | Gaurav | G06F 17/30297 |
| 2008/0235043 | A1* | 9/2008 | Goulandris | G06F 21/33 |
| | | | | 705/1.1 |
| 2009/0143923 | A1* | 6/2009 | Breed | G08G 1/205 |
| | | | | 701/1 |
| 2009/0322510 | A1* | 12/2009 | Berger | G06Q 10/08 |
| | | | | 340/539.1 |
| 2011/0215146 | A1* | 9/2011 | Shams | G06F 17/00 |
| | | | | 235/383 |
| 2011/0264467 | A1 | 10/2011 | Green, III et al. | |

OTHER PUBLICATIONS

Huemer, Christian. "ebxnnl: An emerging b2b framework." University of Vienna, Institute of Computer Science and Business Informatics. Vienna: University of Vienna (2002). (Year: 2002).*

Damodaran, Suresh. "B2B integration over the Internet with XML: RosettaNet successes and challenges." Proceedings of the 13th international World Wide Web conference on Alternate track papers & posters. ACM, 2004. (Year: 2004).*

* cited by examiner

US 10,579,952 B2

TRACKING SHIPMENT CONTAINER

BACKGROUND

The present application relates to tracking shipment items, and more specifically, to the exchange of electronic information associated with the shipment items across multiple systems.

The shipping industry involves multiple entities working together to ship a shipment item, such as a package or a container of packages, from a source to a destination. For example, for a sender to send the shipment item to its destination, the sender may have to interface with multiple electronic data management systems (EDMS) managed by a shipping entity, one or more port terminal operators, a land-transport entity, a receiving entity, and the like. Each of these systems may have their respective requirements, such as rules and formatting for storing data. Because such systems are not interoperable, tracking the status of the shipment item during the transit is challenging.

SUMMARY

According to one or more embodiments, a computer-implemented method for transportation of a shipment container includes receiving, by a first client device, a document schema from a document schema server, the document schema corresponding to a second client device. The method further includes creating, by the first client device, an electronic document according to the document schema, the electronic document created for transmission to the second client device. The creating includes generating, by the first client device, the electronic document including data-fields as specified by the document schema, and filling the data-fields of the electronic document as specified by the document schema. The computer-implemented method also includes transmitting, by the first client device, the electronic document for receipt by the second client device.

According to one or more embodiments, a client device for tracking transportation of a shipment container includes a memory; a network interface, and a processor coupled with the memory and the network interface. The processor receives a document schema from a document schema server, the document schema corresponding to a second client device. The processor creates an electronic document based on the document schema for transmission to the second client device by generating the electronic document including data-fields as specified by the document schema, and filling the data-fields of the electronic document as specified by the document schema. The processor transmits the electronic document for receipt by the second client device.

According to one or more embodiments, a computer program product for tracking transportation of a shipment container includes a non-transitory computer readable storage medium. The computer readable storage medium includes computer executable instructions to receive, by a first client device, a document schema from a document schema server, the document schema corresponding to a second client device. The computer readable storage medium further includes computer executable instructions to create an electronic document based on the document schema, the electronic document created for transmission to the second client device. The electronic document is created by generating the electronic document including data-fields as specified by the document schema, and filling the data-fields of the electronic document as specified by the document schema. The computer readable storage medium further includes computer executable instructions to transmit the electronic document for receipt by the second client device.

BRIEF DESCRIPTION OF THE DRAWINGS

The examples described throughout the present document may be better understood with reference to the following drawings and description. The components in the figures are not necessarily to scale. Moreover, in the figures, like-referenced numerals designate corresponding parts throughout the different views.

DETAILED DESCRIPTION

Typically, in the shipping industry electronic data is stored using Electronic data interchange (EDI) standards, such as X12®, EDIFACT®, ODETTE®. EDI enables an exchange of electronic documents between two companies in an electronic format, only if both companies adhere to the same standard. The current EDI standards are static and cannot deal with new and flexible paradigms of businesses that different companies involved in the shipping industry may use. Additionally, if two partner companies desire to have specific provisions in the electronic documents exchanged between the two partner companies that do not conform to the predetermined standard, it is difficult for them to do so because the added specific provisions render the electronic documents no longer EDI conformant.

EDI standards also require that the systems exchanging the electronic documents have continuous connectivity to an EDI network. However, during transport of a shipment item, several electronic data exchanges may need to happen in environments where network connectivity is not available, such as at a train dockyard where the shipment item is loaded/unloaded.

The technical solutions described herein address shortcomings of the EDI standards, and facilitate flexible and adaptable business operations including activities such as tracking of shipment items. To this end, the technical solutions include a client application (such as a mobile computing device, a desktop, or a web application), which creates an electronic document (in EDI or other format), and which exchanges the data in the electronic document with another client application in a direct peer-to-peer manner. The technical solutions further include a document schema server, which facilitates uploading a new format/schema for the electronic document. The schema may not be EDI conformant. In some examples, a set of partner companies or entities may share the schema or parts thereof to facilitate data exchange. The term "entity" as used herein refers to individuals and groups of individuals that may take a variety of forms, including for example a person, a group of people, an organization, or an artificial agent having natural language processing capabilities.

Using such components, the technical solutions facilitate a extensible peer to peer model for companies to exchange electronic documents with each other in a verifiable manner and invoke special commands, which may be different when each partner entity exchanges the electronic document. Further, the system may be separate from the EDI-based system of the different companies, and further may link back to the EDI-based systems. In one embodiment, the exchange would enable the attainment of a smart contracts based approach, where each document exchanged within two peer mobile devices is considered a digital contract, code implementing business logic is retrieved from a schema server, and can be executed by mobile devices.

Figure 1:
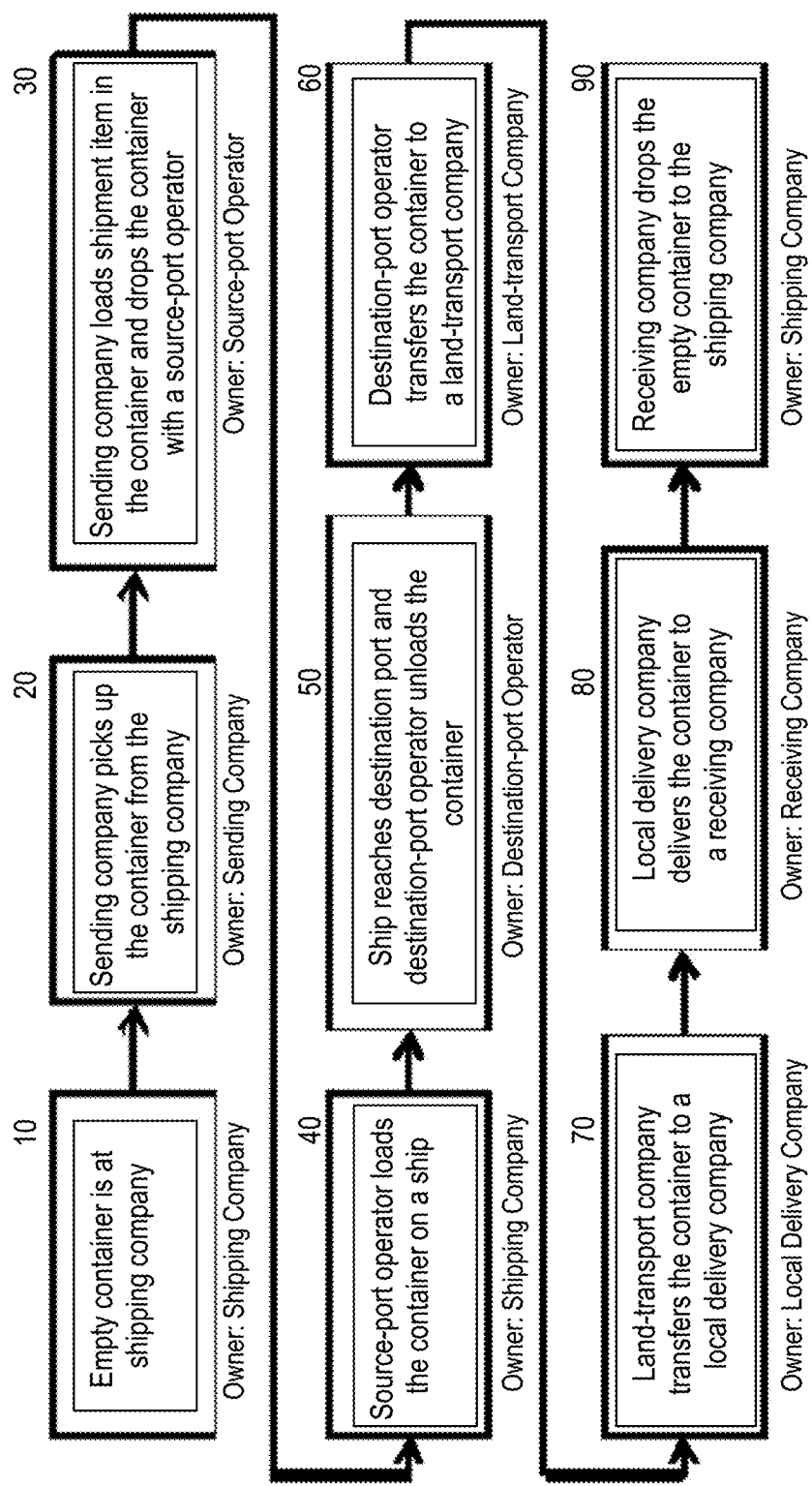
FIG. 1 illustrates an example scenario in the shipping industry for transportation of a shipment container.

For purpose of explaining the operation of the technical solutions described herein, consider the following example scenario from the shipping industry, which is discussed throughout the present disclosure. FIG. 1 illustrates the example scenario in which an example system implementing the technical solutions described here is used. In the illustrated scenario, a sending entity is sending a shipment item to a receiving entity using a shipping container. The sending entity may have to deal with multiple companies and their respective data-management systems when shipping the shipment item to the receiving entity.

For example, the sending entity may initially pick up an empty shipping container from a shipping entity from the shipping entity's dock, depot, or the like, as shown at blocks 10 and 20. The sending entity loads the container with the shipment item and drops off the loaded container with a terminal operator at a source port, referred to as a source-port operator, as shown at block 30. The source-port operator loads the container onto a ship, as shown at block 40. Upon the ship reaching a destination port, a destination-port operator unloads the container from the ship, as shown at block 50. The destination-port operator transfers the container to a land-transport entity, as shown at block 60. The land-transport entity, after transporting the loaded container, may transfer the loaded container to a local delivery entity, as shown at block 70. The local-delivery entity delivers the container to the receiving entity, as shown at block 80. The receiving entity, after unloading the shipment item from the container, drops off the empty container with the shipping entity, for example at a dock, a depot, or the like, as shown at block 90.

As described earlier, each of the entities involved in the above scenario may use a respective EDMS. Thus, the sending entity, the shipping entity, the source-port operator, the destination-port operator, the land-transport entity, the local delivery entity, and the receiving entity, each have their respective EDMS. As the container is transferred among the different entities, a hand-off of ownership of the container occurs, which is electronically documented by creation and maintenance of several artifacts. These artifacts include but are not limited to receipts, consignment note, bill of lading, mate's receipt, invoice, certificate of origin, weight note, inspection certificate, and stowage plan. In any transaction, one or more digital artifacts may be generated and exchanged. FIG. 1 indicates the ownership of the container at each stage of the example scenario. For example, the sending entity provides a receipt and weight note to the shipping entity upon picking up the container. Similarly, the shipping entity provides a bill of lading to the sending entity upon receiving a packed container from the latter. Similar artifacts, such as various types of receipts, are exchanged at each stage of the example scenario. The receipt acknowledges receiving the shipment container. A consignment note confirms the delivery of goods to a shipper or shipper's agent for transportation to a named consignee and the terms for the same. A bill of lading provides a receipt by a shipping entity acknowledging the receipt of the shipment container and the terms for the shipment container. A mate's receipt acknowledges the condition of the contents of the shipment container when received by the shipping carrier. An export invoice lists the contents and is used for customs clearance, certify origin of the contents, list the net weight of the contents and/or the empty container. An inspection certificate states when the contents were inspected. A packing list provides the contents of the shipment container. A stowage plan lists out where containers are located in a ship.

The artifacts may further include a packing list, which is an electronic document, provided by an entity transferring the ownership of the container to the entity receiving the ownership. The packing list enumerates the contents, for example the shipment items or packages in the container. Similar to the bill of lading, the entities exchange a respective packing list at each transfer of ownership in the example scenario. The artifacts may further include a stowage plan, which is an electronic document generated and exchanged by the shipping entity. The stowage plan identifies where, on the ship, the container is stored, and a location at which the container is to be offloaded.

With EDI-based systems, an EDMS of an entity generates an artifact by generating an EDI-conformant electronic document, which the EDMS exchanges using EDI protocols with another EDMS. For example, at the time the sending entity picks up the empty container from the shipping entity, an EDMS of the sending entity generates an EDI document representing the bill of lading, and exchanges the EDI document with an EDMS of the shipping entity. However, as described earlier, such EDI-based data exchange is inflexible due to the requirement of strict compliance with the EDI-standard, and further due to the requirement of constant connectivity to the network. For example, both the sending entity and the shipping entity have to comply with the EDI-standard for the bill of lading. Further, the source-port operator, the destination-port operator, the land transport entity, the local delivery entity, and the receiving entity are required to use the same EDI-standard for the bill of lading so that the respective EDMS' can exchange data. The other artifacts that the EDMS' exchange are also limited similarly. Such strict compliance limits the entities from introducing new types of digital artifacts, or modifying any part of an existing digital artifact created conformant to the standards. Defining a schema as the structure of a document, the current system limits the schema of the documents being exchanged to a few limited ones defined according to the standards. The schema would typically list out the different fields that are included in the document, and any constraints the contents of those fields must satisfy. Instead, the technical solutions described herein, facilitate different entities to use different schemas for their respective artifact. Further, an artifact exchanged between a first pair of entities may have a different schema than an artifact exchanged between a second pair of entities. For example, the bill of lading that is exchanged between the sending entity and the shipping entity may have a different schema than a bill of lading exchanged between the shipping entity and the receiving entity. Thus, the technical solutions described herein improve flexibility of how the electronic data is stored and represented between the entities in the shipping industry.

Additionally, with EDI-based systems, the electronic documents are exchanged between EDMS servers, thus necessitating the entities to have continuous network connections to monitor the exchange of the electronic documents. Instead, the technical solutions described herein facilitate a client device of one entity of the shipping industry to exchange the artifacts with a client device of another entity of the shipping industry in a peer-to-peer manner. Thus, the technical solutions further improve the exchange of electronic data between the entities in the shipping industry by facilitating the data exchange without a continuous network connection. As such, the technical solutions are rooted in and/or tied to computer technology in order to overcome a problem specifically arising in the realm of the shipping industry, and more particularly regarding electronic data exchange among entities involved in the shipping industry when shipping a shipment item.

Figure 2:
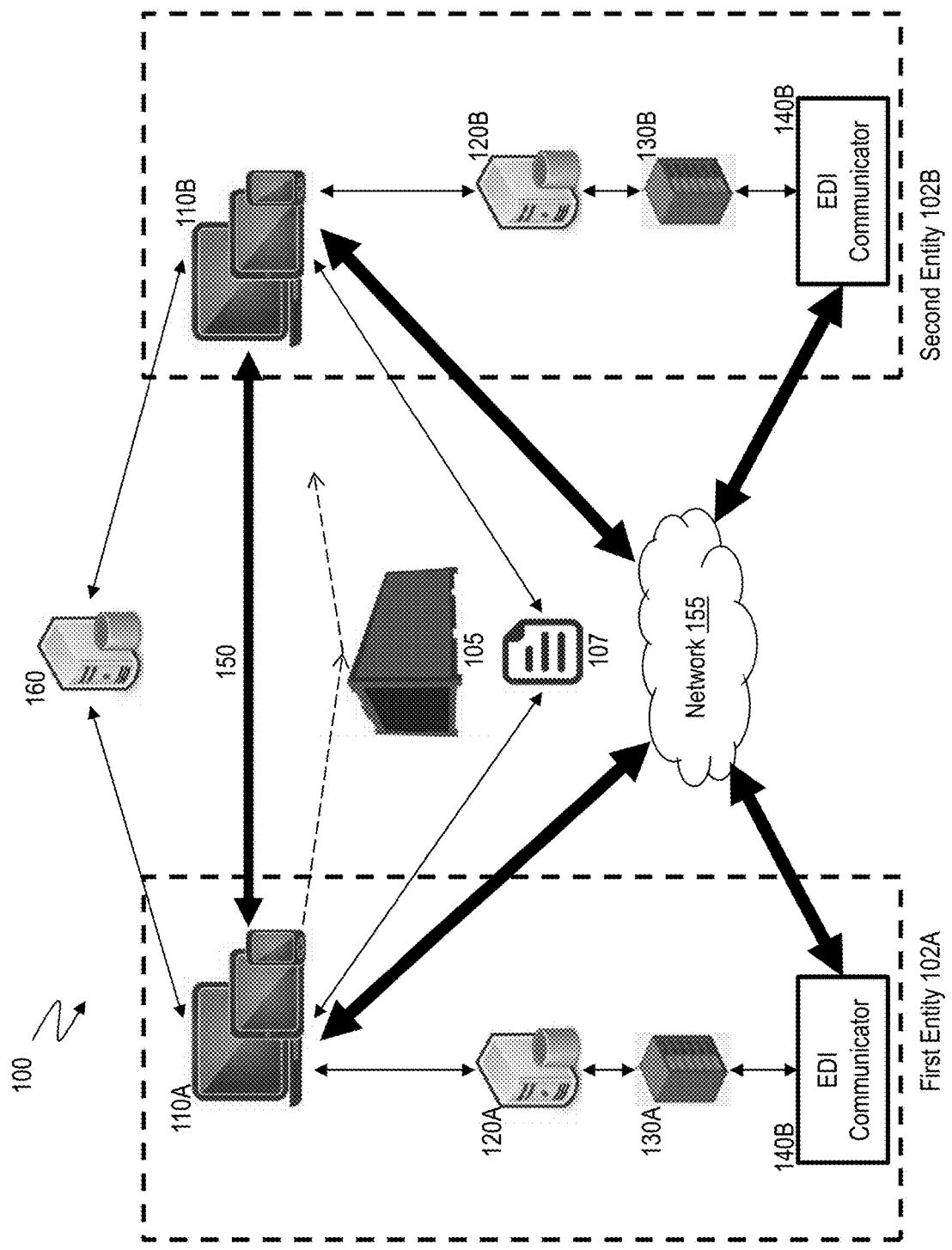
FIG. 2 illustrates example components of an electronic shipping data exchange system in accordance with one or more embodiments.

FIG. 2 illustrates example components of an electronic shipping data exchange system 100. FIG. 2 illustrates the system 100 facilitating an exchange of an artifact 107, which is associated with a shipment container 105, between two entities. Consider that a first entity (on the left in FIG. 2) is providing the artifact 107 to a second entity (on the right in FIG. 2), during transfer of ownership of the shipment container 105 from the first entity to the second entity. In other examples, the second entity may provide the artifact 107 to the first entity by implementing the technical solutions described herein.

The first and the second entities exchange the artifact 107 using a first client device 110A and a second client device 110B respectively. Both, the first client device 110A and the second client device 110B are communication devices, such as a mobile phone, a tablet computer, a laptop computer, a desktop computer, or any other communication device that can communicate in a wired or wireless manner. The first client device 110A and the second client device 110B may or may not be of the same type.

Figure 3:
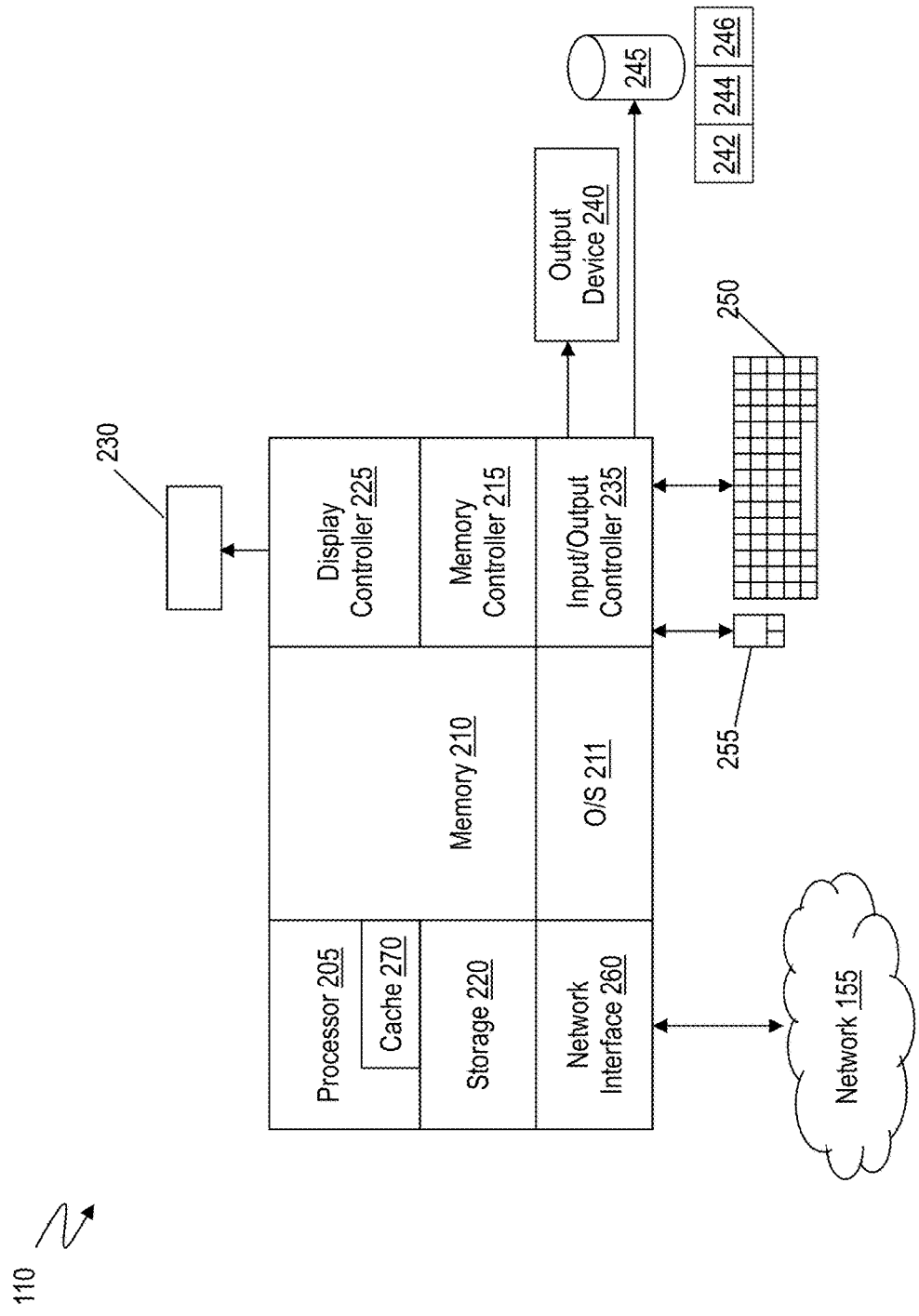
FIG. 3 illustrates example components of a communication device in accordance with one or more embodiments.

FIG. 3 illustrates example components of a communication device 110, which the first client device 110A (shown in FIG. 2) and the second client device 110B (shown in FIG. 2) include. The communication device includes hardware, such as electronic circuitry. The communication device includes, among other components, a processor 205, memory 210 coupled to a memory controller 215, and one or more input devices 245 and/or output devices 240, such as peripheral or control devices that are communicatively coupled via a local I/O controller 235. These devices 240 and 245 may include, for example, battery sensors, position sensors (altimeter 242, accelerometer 244, GPS 246), indicator/identification lights and the like. Input devices such as a conventional keyboard 250 and mouse 255 may be coupled to the I/O controller 235. The I/O controller 235 may be, for example, one or more buses or other wired or wireless connections, as are known in the art. The I/O controller 235 may have additional elements, which are omitted for simplicity, such as controllers, buffers (caches), drivers, repeaters, and receivers, to enable communications.

The I/O devices 240, 245 may further include devices that communicate both inputs and outputs, for instance disk and tape storage, a network interface card (MC) or modulator/demodulator (for accessing other files, devices, systems, or a network), a radio frequency (RF) or other transceiver, a telephonic interface, a bridge, a router, and the like.

The processor 205 is a hardware device for executing hardware instructions or software, particularly those stored in memory 210. The processor 205 may be a custom made or commercially available processor, a central processing unit (CPU), an auxiliary processor among several processors associated with the communication device, a semiconductor based microprocessor (in the form of a microchip or chip set), a macroprocessor, or other device for executing instructions. The processor 205 includes a cache 270, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 270 may be organized as a hierarchy of more cache levels (L1, L2, and so on.).

The memory 210 may include one or combinations of volatile memory elements (for example, random access memory, RAM, such as DRAM, SRAM, SDRAM) and nonvolatile memory elements (for example, ROM, erasable programmable read only memory (EPROM), electronically erasable programmable read only memory (EEPROM), programmable read only memory (PROM), tape, compact disc read only memory (CD-ROM), disk, diskette, cartridge, cassette or the like). Moreover, the memory 210 may incorporate electronic, magnetic, optical, or other types of storage media. Note that the memory 210 may have a distributed architecture, where various components are situated remote from one another but may be accessed by the processor 205.

The instructions in memory 210 may include one or more separate programs, each of which comprises an ordered listing of executable instructions for implementing logical functions. In the example of FIG. 2, the instructions in the memory 210 include a suitable operating system (OS) 211. The operating system 211 essentially may control the execution of other computer programs and provides scheduling, input-output control, file and data management, memory management, and communication control and related services.

Additional data, including, for example, instructions for the processor 205 or other retrievable information, may be stored in storage 220, which may be a storage device such as a hard disk drive or solid state drive. The stored instructions in memory 210 or in storage 220 may include those enabling the processor to execute one or more aspects of the systems and methods of this disclosure.

The communication device may further include a display controller 225 coupled to a user interface or display 230. In some embodiments, the display 230 may be an LCD screen. In other embodiments, the display 230 may include a plurality of LED status lights. In some embodiments, the communication device may further include a network interface 260 for coupling to a network 155. The network 155 may be an IP-based network for communication between the communication device and an external server, client and the like via a broadband connection. In an embodiment, the network 155 may be a satellite network. The network 155 transmits and receives data between the communication device and external systems. In some embodiments, the network 155 may be a managed IP network administered by a service provider. The network 155 may be implemented in a wireless fashion, for example, using wireless protocols and technologies, such as Wi-Fi, WiMAX, satellite, or any other. The network 155 may also be a packet-switched network such as a local area network, wide area network, metropolitan area network, the Internet, or other similar type of network environment. The network 155 may be a fixed wireless network, a wireless local area network (LAN), a wireless wide area network (WAN) a personal area network (PAN), a virtual private network (VPN), intranet or other suitable network system and may include equipment for receiving and transmitting signals.

The communication device may further facilitate direct communication with other communication devices, without using the network 155. For example, referring to FIG. 2, the first client device and the second client device may exchange data using a direct client-to-client communication connection 150. The client-to-client communication connection 150 may be a near-field communication, which a communication device uses when a second communication device is within a predetermined distance from the first communication device. For example, the client-to-client communication connection 150 may use a BLUETOOTH™, a ZIGBEE™, or any other near field communication. For example, if the first client device and the second client device are at a docking yard, where the network 155 is weak or non-existent, the client devices exchange the artifact 107 using the client-to-client communication connection 150. In one or more examples, the client devices use the client-to-client communication connection 150 even if the network 155 is available.

Referring to FIG. 2, the system 100 further includes a first server of the first entity and a second server of the second entity. Both the first server and the second sever may be a computer server. The computer server includes similar components as those illustrated in FIG. 3. For example, the computer server includes, among other components, a processor 205, memory 210 coupled to a memory controller 215, one or more input devices 245 and/or output devices 240 that are communicatively coupled via a local I/O controller 235. The computer server may further include a display controller 225 coupled to a user interface or display 230. The computer server further includes a network interface 260 for coupling to the network 155. The computer server further includes, or accesses a storage 220, which serves as a data repository.

For example, in case of each entity in the shipping industry, the data repository may include internal data of each transaction in which the entity is involved. For example, the first entity stores its internal data in the first server and the second entity stores its internal data in the second server, each server being a computer server. The system 100 may further facilitate the first and the second entity to exchange EDI-based data, such as for legacy purposes. Accordingly, the system 100 includes one or more EDI translators 130A and 130B and one or more EDI communicators 140A and 140B, associated with each the first and the second entity respectively as illustrated. The EDI communicators 140A and 140B transfer (and/or receive) EDI-standards compliant data across the network 155. The EDI communicators 140A and 140B receive the EDI-standards compliant data from the corresponding EDI translators 130A and 130B.

For example, the first entity 102A may store the artifact 107 in the first server 120A using internal data format of the first entity 102A. The EDI communicator 140A of the first entity 102A receives an EDI translated document from the EDI translator 130A of the first entity 102A. The EDI translated document includes some or all of the contents of the artifact 107 formatted according to EDI-standards for the artifact. For example, if the artifact is a bill of lading, the EDI translator 130A generates the EDI translated document, which includes a predetermined set of data-fields according to the EDI standards. The EDI translator 130A fills the data fields in the EDI translated document using the contents of the artifact 107. The EDI communicator 140A transmits the EDI translated document to the EDI communicator 140B of the second entity 102B. The EDI communicator 140B of the second entity transfers the EDI-translated document to the EDI translator 130B. The EDI translator 130B translates the EDI-translated document into internal data structures of the second entity 102B. The data in the internal data format is then sent to the second server 120B, which then stores the data in the internal data format of the second entity 102B. Accordingly, the only contents of the artifact 107, which get translated, and exchanged, are those in the predetermined EDI-standards set for the artifact 107.

However, the data exchange in this manner is inflexible, as the exchange is constrained by the predetermined set of data-fields, which provide a format and rules for the content of the data. For example, consider the case where a shipping entity wants to add a new constraint such as a container that is loaded in New York, and destined to Saudi Arabia is to be maintained separately from a container that is destined to Israel due to political animosity between the two destination countries. If this is a new constraint, the stowage plans from the terminal operator will not reflect this change, and it will be hard to put such new constraints in the EDI-based system, because the EDI-standards do not have a data-field for such a constraint. It is understood that the above is just an example of a new constraint, and that other examples may include different new constraints or a combination thereof.

Instead, the electronic shipping data exchange system 100 that implements the technical solutions described herein addresses addition of such new constraints based on a schema server 160 (shown in FIG. 2). The schema server 160 may include the same components as the computer server, such as those depicted in FIG. 3. While FIG. 3 depicts the schema server 160 as being common between the first entity and the second entity, in one or more examples, each entity, such as the shipping entity, a port operator, etc. may have a respective scheme server. In other examples, all the entities use a common schema server. The schema server 160 provides constraints for the entities to follow when exchanging artifacts, such as the artifact 107. The schema server 160 further facilitates the entities, via the client device 110 and/or via the computer server, to modify and/or add constraints. In addition, the schema server 160 provides instructions for the client device 110 to accumulate and/or generate content to be added into the artifact 107. The schema server 160 may also store and provide computer executable instructions that each of the client device can execute after exchanging the digital artifacts. The instructions may be different for each of the entities, and allow them to run respective processes.

Figure 9:
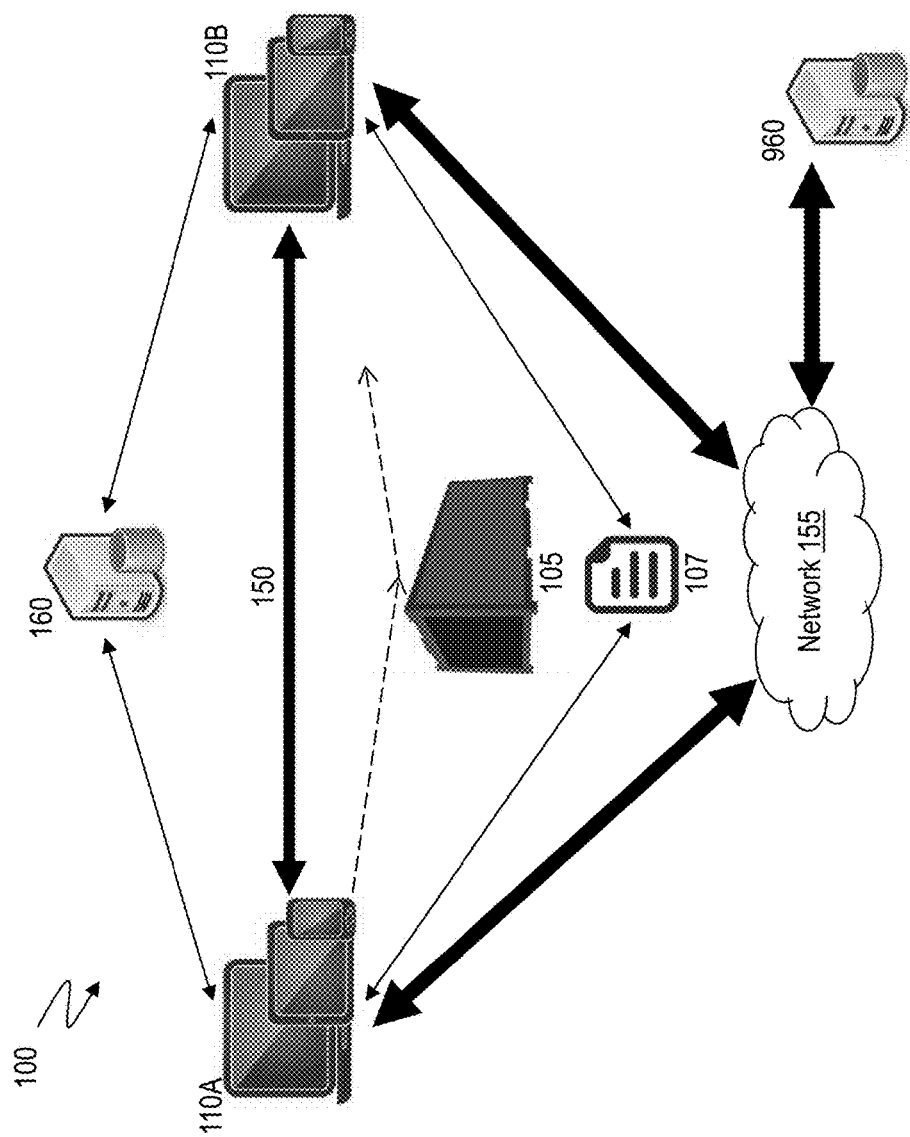
FIG. 9 illustrates an example scenario in the shipping industry for transportation of a shipment container.

In some embodiments, the schema server 160 may maintain a copy of the digital artifacts in the system 100, and combine information from the digital artifacts with other information sources to provide additional information of the shipping container 105, such as a location of the shipment container 105. Alternatively or in addition, the system 100 may include a distinct processing server that analyzes the artifact 107 to determine the location of the shipment container 105. For example, FIG. 9 illustrates the system 100 that includes a processing server 960, which may be a computer server that includes the components such as those illustrated in FIG. 3. The processing server 960 may be a digital artifact server, which contains each artifact that was generated by the entities through the transportation of the shipment container 105 from the sending entity to the receiving entity. The processing server 960 may execute real-time analytics on the artifacts, such as combining information from other sources. By analyzing the information, such as shipping and rail-line schedules, the processing server 960 facilitates tracking the locations of the shipment container 105 based on the artifacts that are transferred.

For example, consider that the shipment container 105 left the port of San Francisco on a goods train. The goods train operator, such as AMTRAK™, may maintain a computer server that provides a schedule, or a the current location of the train. At the handover of the shipment container 105 from the terminal operator to the train operator, the first client device 110A (of the terminal operator) reports the location of the hand-off. The second client device 110B (of the train operator) indicates, to the processing server 960, an identity of the train on which the shipment container 105 is placed. Alternatively or in addition, the information of the train may be inferred by correlating the location of the hand-off with the train schedule. Until the next hand-off point, the location of the train provides the location of the shipment container 105. Thus, by combining information from various sources, and extrapolating from points where location is specifically determined, the locations of shipment container is determined without using actual tracking devices.

Figure 4:
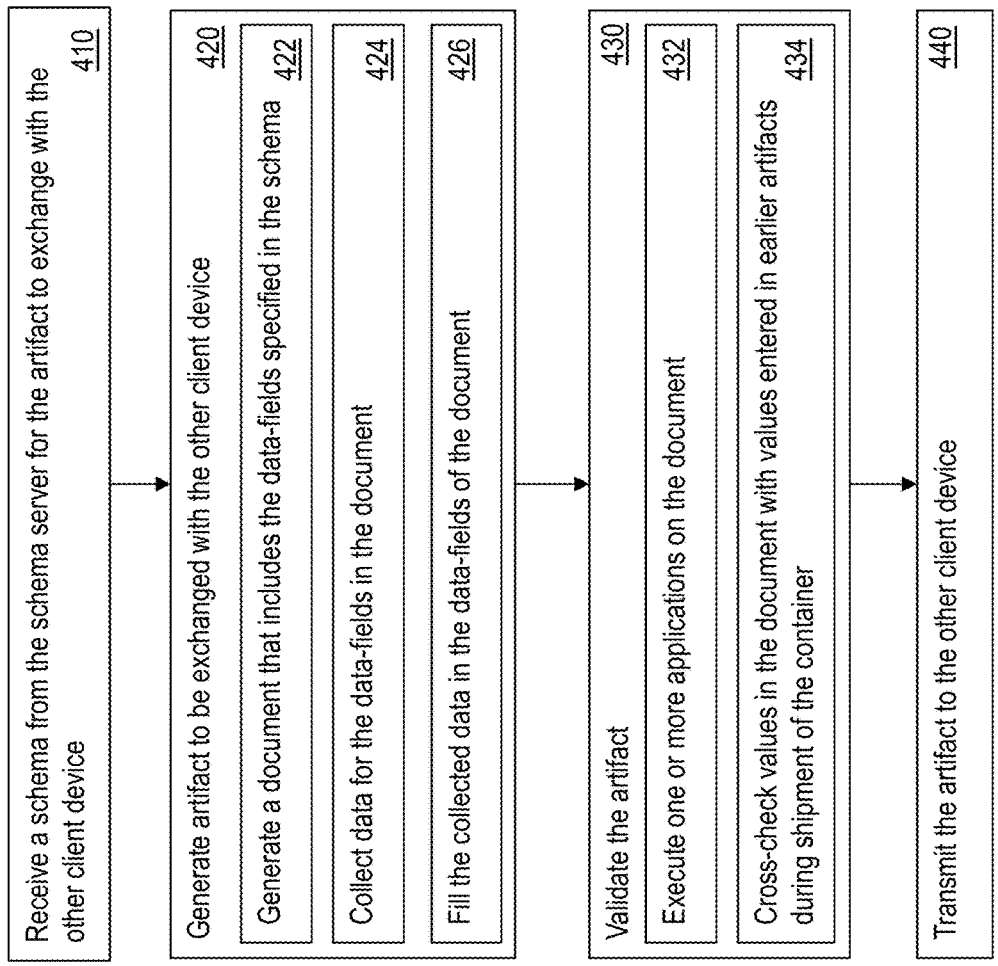
FIG. 4 illustrates a flowchart of an example method of using a schema server to generate an electronic artifact exchanged by entities of the shipping industry during transportation of a shipment container in accordance with one or more embodiments.

FIG. 4 illustrates a flowchart of an example method of using the schema server 160 to generate the artifact 107. For example, as described earlier, at the time the first entity is transferring ownership of the container 105 to the second entity, the first entity also provides an artifact, such as a bill of lading, a stowage plan, or the like, to the second entity (or vice versa). In our illustrated example, the first entity provides the artifact 107 to the second entity. In this regard, the first client device 110A of the first entity 102A receives, from the schema server 160 for a schema for the artifact 107, which is to be exchanged with the second client device 110B of the second entity 102B, as shown at block 410.

Figure 5:
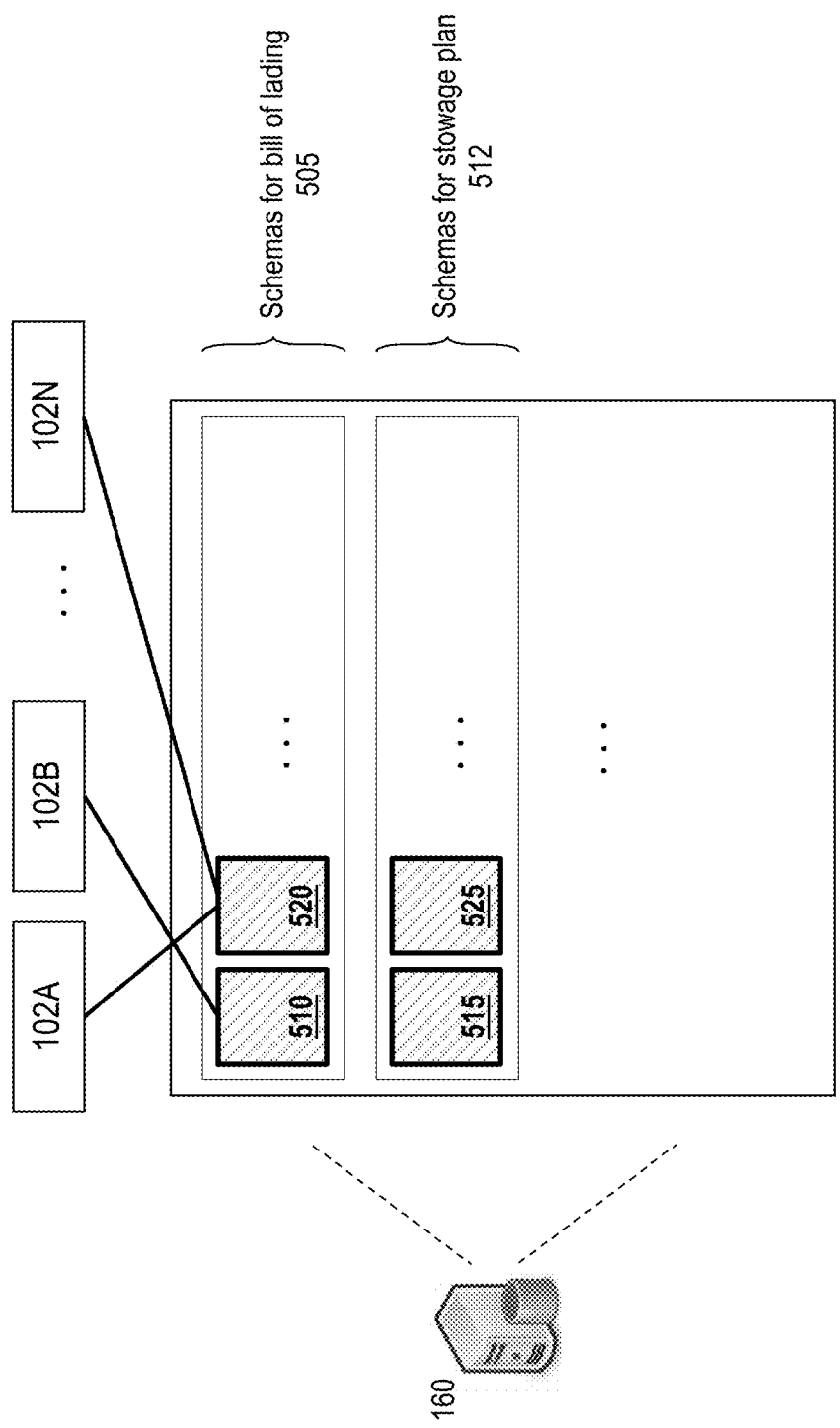
FIG. 5 illustrates different types of schemas that a schema server stores in accordance with one or more embodiments.

FIG. 5 illustrates different types of schemas that the schema server 160 stores. In the illustrated example, the schemas are depicted based on the types of the artifacts. For example, a collection of schemas 505 for bill of lading and a collection of schemas 512 for stowage plans are illustrated. The collection of schemas 505 may include multiple schemas 510 and 520 for bill of lading. The collection of schemas 512 may include multiple schemas 515 and 525 for stowage plans. However, the schemas may be organized in any other manner, for example, according to the entity that created the schema, the entity that last modified the schema, or any other manner. An entity may create and store a schema on the schema server that is specific for that entity. For example, the second entity 102B may store, on the schema server 160, a schema 510 for a bill of lading that is specific to the second entity 102B. Thus, any other entity that is transferring a bill of lading to the second entity 102B is to use the schema 510 from the schema server 160. Another entity may opt to use a schema that already exists on the schema server, or alternatively, create a schema specific to that entity. For example, a schema 520 for the bill of lading may be common to one or more entities, such as the first entity 102A and a third entity 102N. The schema server 160 further stores schemas for other types of artifacts that the entities may generate and exchange throughout the shipping process.

In another example, one or more entities may store, on the schema server 160, one or more schemas specific to the container 105. For example, in the above scenario of separating the container 105 destined for Israel from other containers headed to Saudi Arabia, the sending entity or the shipping entity, or any other entity, may create a schema that is specific to the container 105 that includes the constraint associated with the container 105. Accordingly, in this case, the first client device 110A that is generating the artifact 107 associated with the container 105, requests the schema server 160 for the schema associated with the container 105. Schemas may be associated with containers, with specific entities, a specific pair of entities or some attributes of an entity or a pair of entities, e.g. all users within a country may need to use a special schema, or all ships leaving from U.S.A. to Cuba may need to use a special schema.

Figure 6:
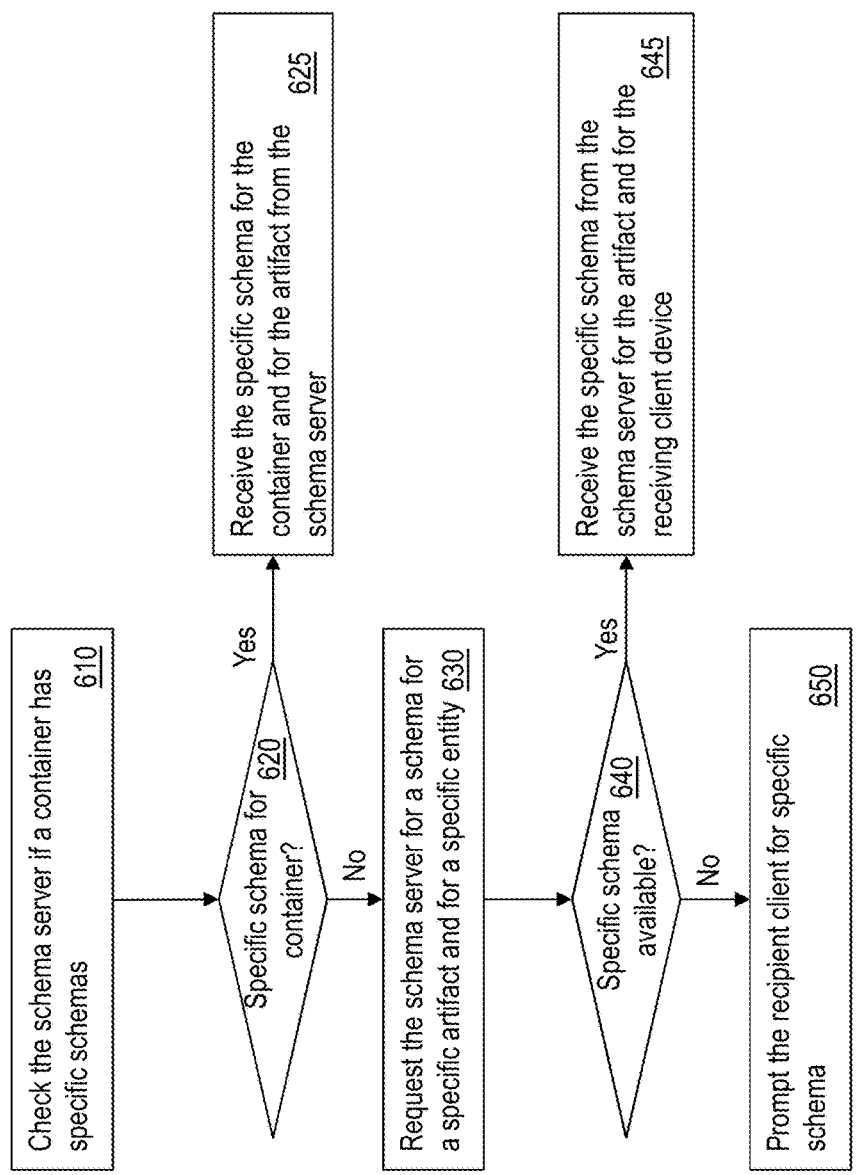
FIG. 6 illustrates a method for a client device to request a specific schema from a schema server in accordance with one or more embodiments.

FIG. 6 illustrates a method for the first client device 110A to request a specific schema from the schema server 160. The first client device 110A checks the schema server 160 if the container 105 has specific schemas, as shown at block 610. If the container 105 does have specific schemas, the first client device 110A requests the schema server 160 for the specific schema associated with the container and with the type of the artifact 107, as shown at blocks 620 and 625. If the schema server 160 does not have schemas specific to the container 105, the first client device 110A requests the schema server 160 for a specific schema associated with the type of the artifact 107 and the entity receiving the artifact 107, as shown at blocks 620 and 630. If the schema server does contain the specific schema, the first client device 110A receives the specific schema, as shown at blocks 640 and 645. If the schema server 160 does not contain the specific schema requested, the client device 110 prompts the second client device 110B, which is receiving the artifact 107, for a schema to generate the artifact 107, as shown at block 650. The first client device 110A may prompt the second client device 110B using the client-to-client communication connection 150. Alternatively or in addition, the first client device 110A may prompt the second client device 110B via the network 155. Accordingly, based on the type of the artifact 107 (e.g., bill of lading, stowage plan, etc.) to be exchanged, the one or more entities receiving the artifact 107, and/or the container 105, the first client device 110A receives the schema for the artifact 107.

To request the schema for the artifact 107, the first client device 110A specifies a unique identifier of the second entity, such as a name, an identification number, or any other type of identifier associated with the second entity. The schema may also be requested based on an identifier associated with the second client device 110B, such as an IP address, a MAC address, a serial number, or any other such unique identifier associated with the second client device 110B. Further yet, a unique identifier of the container, such as a tracking number, a serial number, or any other identifier associated with the container 105 may be used to request the specific schema associated with the container 105. Further yet, the location of the client device or the type of digital artifact may be used to request a schema. The schema may also be based on attributes such as the country where the shipment is intended to terminate, or the set of countries the shipment is supposed to use for transit.

The received schema contains specific constraints for the artifact 107. Referring back to FIG. 4, the first client device 110A generates the artifact 107 according to the schema, as shown at block 420. For example, the first client device 110A generates an electronic document that includes the data-fields specified in the schema, as shown at block 422. The data-fields are initially blank or empty. The first client device 110A collects the data (that is content) for the data-fields of the electronic document as specified by the schema, as shown at block 424. In one or more examples, the schema specifies one or more rules according to which the client device 110 collects and records the data into the data-fields. For example, the schema instructs the first client device 110A to collect such information to be filled in the electronic document via the network 155 from specific network locations, such as web-addresses. The data at the network location may be updated dynamically, thus facilitating the artifact 107 to include latest information. Alternatively, the schema may instruct the first client device 110A to gather the information via one or more peripheral devices 245 of the first client device 110A, such as a camera, a barcode scanner, or other such peripherals. For example, the first client device 110A may parse the information based on a barcode on the container 105, or on a shipping label associated with the container 105. The first client device 110A subsequently fills the collected data into the data-fields of the electronic document, as shown at block 426. For example, the first client device 110A fills in the serial number, port of origin, port of destination, and other such details regarding the container 105 in the corresponding data-fields of the electronic document. Further, the first client device 110A fills the data-fields of the electronic document with information such as the details of the sending entity, the receiving entity, the shipping entity, and other entities involved in the shipment. The electronic document may include various other data-fields.

Further yet, the schema instructs the first client device 110A to validate the electronic document according to the schema, as shown at block 430. For example, the schema may instruct the client device 110 to perform one or more actions, such as initiating and/or executing one or more applications or modules to validate form of the electronic document, as shown at block 432. For example, validating the form of the electronic document may include ensuring that the electronic document uses one or more fonts, font-sizes, headers, footers, and other document formatting specifications in the schema. The validation may further include validating the content of the electronic document. For example, the validation may include executing a spell-check on the generated electronic document. The validation may further include executing test conditions or crosschecks to ensure that the values in the artifact 107 matches one or more values entered in a previous artifact that was created by a different entity, as shown at block 434. For example, the validation may facilitate ensuring that expected tax value or duty value entered in an artifact generated at the source-port matches the actual tax value or duty value at the destination-port within a predetermined threshold. Alternatively or in addition, other various crosschecks may be specified in the schema for the first client device 110A to perform. Accordingly, the first client device 110A ensures that the content in the artifact 107 is valid based on the constraints and rules that the schema specifies.

Additionally, the schema instructs the first client device 110A to validate the electronic document by using cryptographically signed digests to one or more servers, or using smart contract paradigm based on block-chain technology.

The data-fields, constraints, operations, and other aspects of the schema may be added by one or both of the first entity and the second entity. Accordingly, the first client device 110A generates the artifact 107 dynamically, and specifically for the second client device 110B. For example, the first client device 110A generates the artifact 107 for the second client device 110B, which may be different than another artifact for a third client device, where both artifacts of the same type (such as bill of lading, stowage plan etc.).

Figure 7:
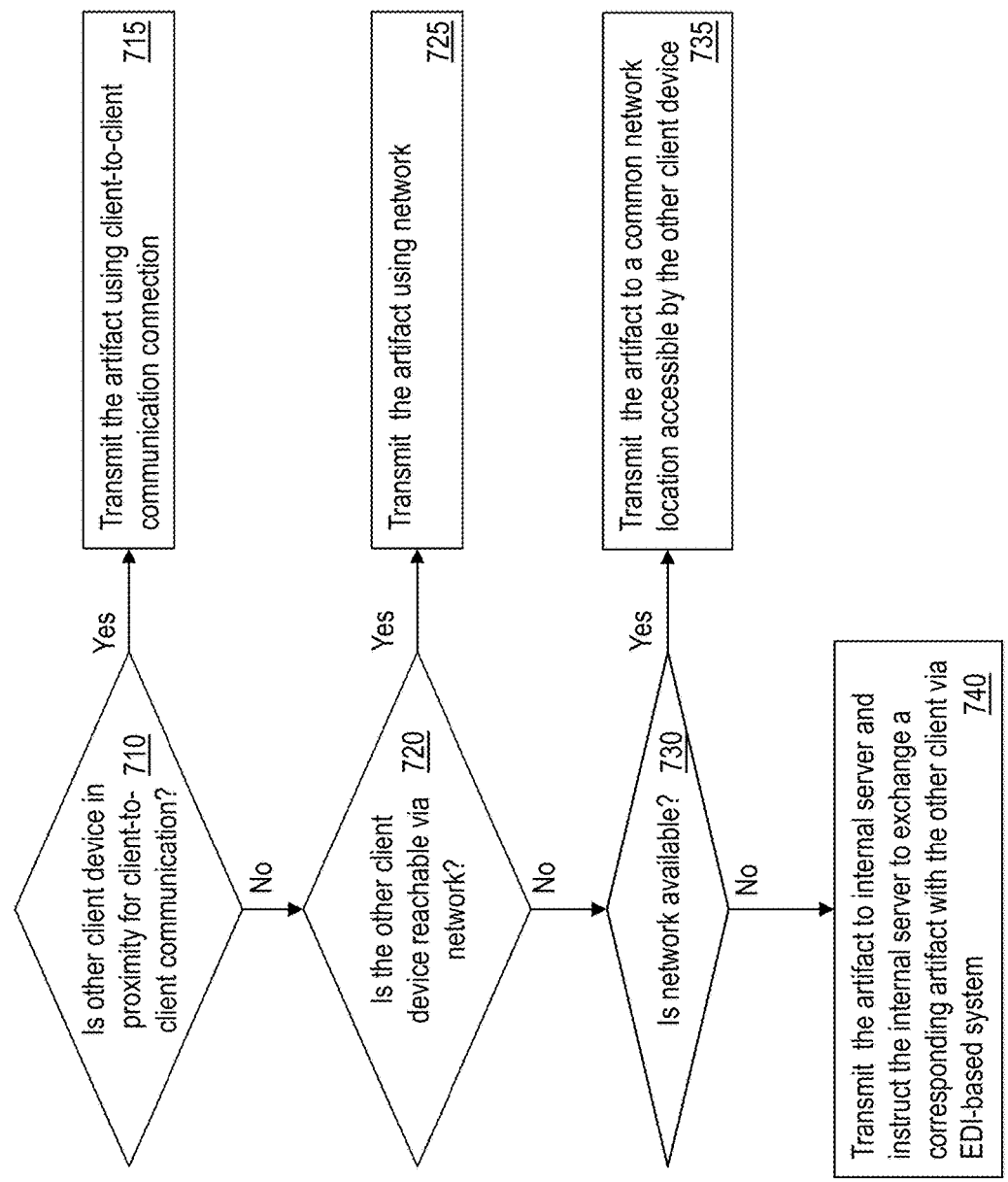
FIG. 7 illustrates a flowchart of an example method for a first client device to transmit an electronic artifact to a second client device in accordance with one or more embodiments.

Once the artifact 107 has been generated, the first client device 110A transmits the artifact 107 to the second client device 110B, as shown at block 440. FIG. 7 illustrates a flowchart of an example method of transmitting the artifact to the second client device 110B. The first client device 110A may transmit the artifact to one or more servers in the system, such as the schema server 160, or the processing server 960.

For example, the first client device 110A may determine whether the second client device 110B is available for a client-to-client transfer, and if so, transmit the artifact 107 via the client-to-client communication connection 150, as shown at blocks 710 and 715. If the second client device 110B is not available for the client-to-client communication, the first client device 110A determines if the second client device 110B is available for a network transfer. For example, the second client device 110B may be out of the range for the client-to-client communication connection 150. If the second client device 110B is available for the network transfer, the first client device 110A transmits the artifact 107 via the network 155, as shown at blocks 720 and 725. Alternatively, if the second client device 110B is not available for a network transfer, but if the network 155 is available, the first client device 110A may store the artifact at a common network location, which is accessible by the second client device 110B, as shown at blocks 730 and 735. Alternatively or in addition, the first client device 110A may store the artifact 107 in the first server 120A and request the first server 120A to communicate an EDI-based counterpart document of the artifact 107 to the second server 120B of the second entity, as shown at block 740. Thus, in one or more examples, the exchange system may share the artifact 107 according to the schema from the schema server 160 and in addition share the EDI-based document via the internal servers 120A and 120B.

Accordingly, the electronic shipping data exchange system 100 facilitates a first client device 110A, such as a mobile device to create an electronic document with data-fields specified in the schema from the schema server 160, and capture information to be stored in the electronic document. In one or more examples, the first client device 110A may generate and fill the electronic document automatically. For example, the sending entity may share the packing list of the container 105 among the different entities facilitating each of the entities to generate a specific schema for the container 105. The specific schema may include information parsed from the packing list. Based on the specific schema, the various entities may automatically create and fill the bill of lading.

For example, the client device of the shipping entity may automatically create the bill of lading using information about the shipping entity. The information can be captured from the client device of the shipping entity itself. For example, the information may include details of the entity taking it in (such as entity name, address, telephone number, facsimile number, website and so on). The information may further include the location of the transfer (which may be automatically determined using the global positioning system (GPS) of the client device). The information may further include the identification of the container (which may be captured by an image of the container), among other details. In another example, the location of the transfer may be obtained from the processing server 960, which is a repository of the digital artifacts. As described herein the processing server 960 processes information of different locations where the digital artifacts are created to determine the state of the shipment container 105 at any given time.

In another example, the stowage plan may be constructed automatically when loading the container onto the ship. The automatically generated stowage plan reflects how containers are loaded, such as whether to separate the containers. Further, the stowage plan for loading containers onto the ship can be created when a collection of several bills of lading is given to the ship's captain by the port. Further, the stowage plan may be crosschecked with the collection of the bills of lading automatically as part of validating the stowage plan.

Figure 8:
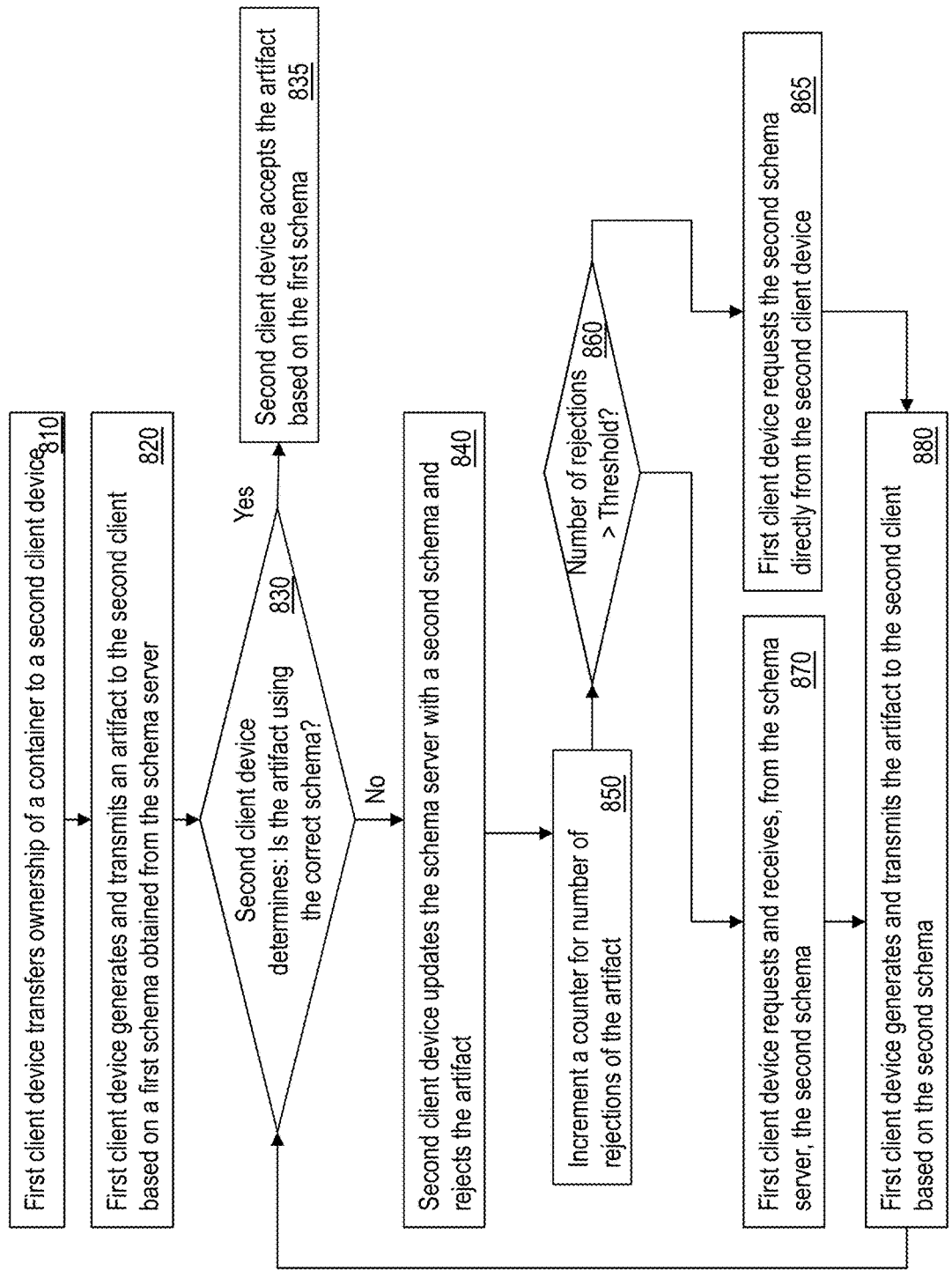
FIG. 8 illustrates a flowchart of an example method for an electronic shipping data exchange system to dynamically update a schema for an electronic artifact in accordance with one or more embodiments.

FIG. 8 illustrates a flowchart of a method by which the system 100 facilitating an entity to dynamically update the schema for the artifact 107. For example, the first client device 110A transfers ownership of the container 105 to the second client device 110B, as shown at block 810. The first client device 110A generates and transmits the artifact 107 to the second client device 110B based on a first schema obtained from the schema server 160, as described herein, and as shown at block 820. The second client device 110B determines whether the artifact 107 is using the correct schema, as shown at block 830. For example, the second client device 110B may compare a version number associated with the first schema with a latest version number that the second client device 110B is using. Alternatively or in addition, the second client device 110B may have a different schema prepared for the container 105, which the second client device 110B has not yet uploaded to the schema server 160. If the first schema used by the artifact 107 is the appropriate schema, the second client device 110B accepts the artifact 107 and continues shipping the container, as shown at block 835. If the first schema is not the appropriate schema, the second client device 110B rejects the artifact 107 and uploads the appropriate schema to the schema server 160, as shown at block 840.

The first client device 110A may keep track of a number of times the artifact 107 has been rejected by the second client device 110B. In response to the artifact 107 being rejected by the second client device 110B, the first client device 110A increments the number of rejections of the artifact, as shown at block 850. If the number of rejections crosses a predetermined threshold, the first client device 110A requests the second client device 110B for the appropriate schema directly using the client-to-client communication connection 150, as shown at blocks 860 and 865. If the number of rejections has not crossed the predetermined threshold, the first client device 110A requests and receives the second schema from the schema server 160, as shown at block 870. The first client device 110A generates and transmits a new artifact to the second client based on the second schema, as shown at block 880. Accordingly, the second client device 110B can dynamically update the schema being used by the first client device 110A.

The technical solutions described herein facilitate exchanging electronic data among one or more entities in a shipping industry in a seamless manner. The technical solutions include a client device, such as a mobile device executing an application, which automatically creates a well-formed electronic document with unexpected inputs, as specified by a schema created by a second client device. The client devices may exchange the electronic document via network communication, or a direct client-to-client communication connection. The first client device may determine the schema for the electronic document via one or more document schema servers, which facilitates the client devices to extend the set of types of documents and their corresponding schemas that are exchanged.

The present technical solutions may be a system, a method, and/or a computer program product at any possible technical detail level of integration. The computer program product may include a computer readable storage medium (or media) having computer readable program instructions thereon for causing a processor to carry out aspects of the present technical solutions.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present technical solutions may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present technical solutions.

Aspects of the present technical solutions are described herein with reference to flowchart illustrations and/or block diagrams of methods, apparatus (systems), and computer program products according to embodiments of the technical solutions. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present technical solutions. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A second action may be said to be "in response to" a first action independent of whether the second action results directly or indirectly from the first action. The second action may occur at a substantially later time than the first action and still be in response to the first action. Similarly, the second action may be said to be in response to the first action even if intervening actions take place between the first action and the second action, and even if one or more of the intervening actions directly cause the second action to be performed. For example, a second action may be in response to a first action if the first action sets a flag and a third action later initiates the second action whenever the flag is set.

To clarify the use of and to hereby provide notice to the public, the phrases "at least one of <A>, <B>, . . . and <N>" or "at least one of <A>, <B>, <N>, or combinations thereof" or "<A>, <B>, . . . and/or <N>" are to be construed in the broadest sense, superseding any other implied definitions hereinbefore or hereinafter unless expressly asserted to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

It will also be appreciated that any module, unit, component, server, computer, terminal or device exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Such computer storage media may be part of the device or accessible or connectable thereto. Any application or module herein described may be implemented using computer readable/executable instructions that may be stored or otherwise held by such computer readable media.

The descriptions of the various embodiments of the present technical solutions have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application, or technical improvement over technologies found in the marketplace, or to enable others of ordinary skill in the art to understand the embodiments disclosed herein.

What is claimed is:

1. A computer-implemented method for transportation of a shipment container, the method comprising:
   receiving, by a first client device, a first document schema from a document schema server, the first document schema corresponding to a second client device;
   creating, by the first client device, an electronic document according to the first document schema, the electronic document created for transmission to the second client device, wherein the creating comprises:

generating, by the first client device, the electronic document comprising data-fields as specified by the first document schema; and
filling, by the first client device, the data-fields of the electronic document as specified by the first document schema, the first document schema being specific for the shipment container being transported;
transmitting, by the first client device, the electronic document for receipt by the second client device;
receiving, by the first client device, at least a predetermined number of rejections of the electronic document from the second client device;
in response to receiving at least the predetermined number of rejections:
requesting and receiving, by the first client device, a second document schema from the second client device, the second document schema being specific for the second client device;
creating, by the first client device, a second electronic document according to the second document schema for transmission to the second client device; and
updating, by the second client device, the document schema server to include the second document schema; and
determining, by the first client device, that the second client device is within a predetermined proximity and in response, transmitting the second electronic document to the second client device using client-to-client communication connection, otherwise transmitting the second electronic document to the second client device via one or more document transfer servers.

2. The computer-implemented method of claim 1, wherein transmitting the electronic document further comprises:
determining availability of the second client device for a first type of network communication connection; and
in response to the second client device being unavailable for the first type of network communication connection, transmitting the electronic document for receipt by the second client device via a client-to-client communication connection.

3. The computer-implemented method of claim 1, wherein filling the data-fields of the electronic document further comprises:
capturing data associated with the shipment container using a peripheral device; and
parsing the captured data for content to add in the data-fields.

4. The computer-implemented method of claim 1, further comprises transmitting the electronic document to a processing server for analyzing the electronic document to identify a location of the shipment container.

5. The computer-implemented method of claim 1, further comprising:
validating a format of the data-fields of the electronic document based on the first document schema; and
validating content of the data-fields of the electronic document based on contents of a second electronic document that was previously generated by a third client device.

6. The computer-implemented method of claim 1, wherein filling the data-fields further comprises receiving computer executable instructions from the document schema server and the computer-implemented method further comprises executing, by the first client device, after transmitting the electronic document, the computer executable instructions that are received.

7. The computer-implemented method of claim 1, wherein the second document schema is received via the document schema server.

8. A client device for tracking transportation of a shipment container, the client device comprising:
a memory;
a network interface; and
a processor coupled with the memory and the network interface, and the processor configured to:
receive a document schema from a document schema server, the document schema corresponding to a second client device;
create an electronic document based on the document schema for transmission to the second client device, by:
generating the electronic document comprising data-fields as specified by the document schema; and
filling the data-fields of the electronic document as specified by the document schema, the first document schema being specific for the shipment container being transported; and
transmit the electronic document for receipt by the second client device;
receive at least a predetermined number of rejections of the electronic document from the second client device;
in response to receiving at least the predetermined number of rejections:
request and receive a second document schema from the second client device, the second document schema being specific for the second client device;
create a second electronic document according to the second document schema for transmission to the second client device;
update the document schema server to include the second document schema; and
determine that the second client device is within a predetermined proximity, and in response, transmit the second electronic document to the second client device using client-to-client communication connection, otherwise transmit the second electronic document to the second client device via one or more document transfer servers.

9. The client device of claim 8, wherein the transmission of the electronic document further comprises:
determining availability of the second client device for network communication via a first communication network connection; and
in response to the second client device being unavailable for the network communication via the first communication network connection, transmitting the electronic document for receipt by the second client device via a client-to-client communication connection.

10. The client device of claim 8, further comprising a peripheral device coupled with the processor, and wherein the processor is further configured to:
capture data associated with the shipment container using the peripheral device; and
parse the captured data for content to add in the data-fields of the electronic document.

11. The client device of claim 10, wherein the peripheral device is from a plurality of peripheral devices consisting of a camera, a scanner, and a global positioning system.

12. The client device of claim 8, wherein the processor is further configured to validate content of the data-fields of the electronic document based on contents of a second electronic document generated by a third client device.

13. A computer program product for tracking transportation of a shipment container, the computer program product comprising a non-transitory computer readable storage medium, the computer readable storage medium comprising computer executable instructions, wherein the computer readable storage medium comprises instructions to:
  receive, by a first client device, a document schema from a document schema server, the document schema corresponding to a second client device;
    create an electronic document based on the document schema, the electronic document created for transmission to the second client device, by:
    generating the electronic document comprising data-fields as specified by the document schema; and
      filling the data-fields of the electronic document as specified by the document schema, the first document schema being specific for the shipment container being transported; and
  transmit the electronic document for receipt by the second client device;
  receive at least a predetermined number of rejections of the electronic document from the second client device;
  in response to receiving at least the predetermined number of rejections:
    request and receive a second document schema from the second client device, the second document schema being specific for the second client device;
    create a second electronic document according to the second document schema for transmission to the second client device;
    update the document schema server to include the second document schema; and
    determine that the second client device is within a predetermined proximity, and in response, transmit the second electronic document to the second client device using client-to-client communication connection, otherwise transmit the second electronic document to the second client device via one or more document transfer servers.

14. The computer program product of claim 13, wherein the transmission of the electronic document further comprises:
  determining availability of the second client device for network communication via a first communication network connection; and
  in response to the second client device being unavailable for the network communication via the first communication network connection, transmitting the electronic document for receipt by the second client device via a client-to-client communication connection.

15. The computer program product of claim 13, wherein the computer readable storage medium further comprises instructions to:
  capture data associated with the shipment container using a peripheral device of the first client device; and
  parse the captured data for content to add in the data-fields of the electronic document.

16. The computer program product of claim 13, wherein the computer readable storage medium further comprises instructions to validate content of the data-fields of the electronic document based on contents of a second electronic document generated by a third client device.

* * * * *